March 9, 1937.  L. M. MYERS  2,073,251
VOLTMETER ARRANGEMENT
Filed Aug. 28, 1935

INVENTOR.
LEONARD MORRIS MYERS
BY
ATTORNEY.

Patented Mar. 9, 1937

2,073,251

UNITED STATES PATENT OFFICE 2,073,251

VOLTMETER ARRANGEMENT

Leonard Morris Myers, Middlesbrough, England, assignor to Radio Corporation of America, a corporation of Delaware Application August 28, 1935, Serial No. 38,234

4 Claims. (Cl. 171—327)

This invention relates to voltmeter arrangements and has for its object to provide a voltmeter arrangement suitable for measuring high-frequency voltages within the usual range of broadcasting frequencies and adapted to measure voltages from about 10 volts to about 10,000 volts. As will be seen later, the invention provides a voltmeter arrangement which has the important advantages—particularly for high-frequency use—that its power absorption is extremely small, practically nil, while its capacity at high-frequency is of so small an order as not materially to affect the character of the input from the source whose voltage is to be measured.

According to this invention, a voltmeter arrangement comprises two piezo-electric crystals disposed within a press and insulated from one another, said crystals being so arranged in said press that the pressure thereof is applied through one to the other, means being provided for applying voltages from the source to be measured to opposite faces of one crystal (hereinafter termed the "primary") and known means being provided for measuring or indicating voltages set up across the opposite faces of the other crystal (hereinafter termed the "secondary"). The whole arrangement is such that application of the voltages to be measured to the primary crystal cause mechanical movements thereof, which movements are transmitted to the secondary crystal and set up thereacross voltages which are fed to the voltage measuring or indicating means.

The voltage measuring or indicating means connected across the secondary crystal should be of as small a power absorption as possible and may be constituted, for example, by a cathode ray tube having two deflector plates (to which the voltage to be indicated is applied) so that deflection in one direction only is obtained the position of the end of the bright line formed by the vibrating spot on the fluorescent screen of the cathode ray tube indicating the applied peak voltage and being substantially linearly proportional thereto. Such oscillograph voltage measuring devices are well known, per se.

Preferably the secondary crystal is shunted by a grid leak which serves the purpose of discharging potentials due to the static pressure applied by the press and which accordingly ensures that variations in static pressure, due for example to the expansion of the parts of the press, will not produce faulty readings.

Figure 1:
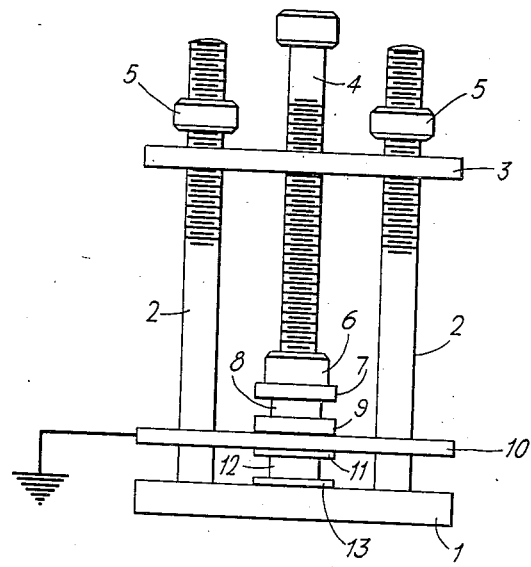
Figure 2:
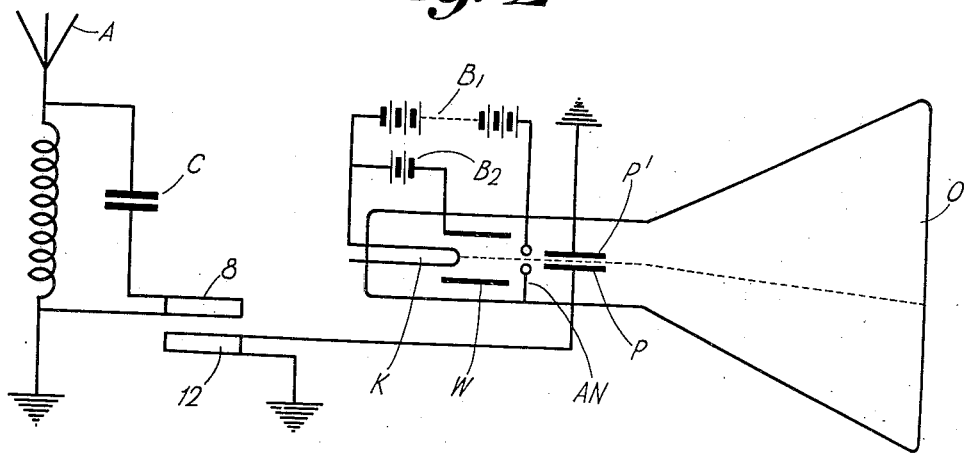

The invention is illustrated in the accompanying schematic drawing in which Figure 1 is an elevation of one form of press having a pair of piezo-electric crystals mounted therein in accordance with the invention, and Figure 2 a circuit arrangement suitable for use with the arrangement shown in Figure 1.

Referring to Figure 1, the press comprises a base member 1 having screwed rods or studs 2 inserted therein, said rods or studs passing through holes in a yoke member 3 which is drilled and tapped centrally thereof to receive a clamping bolt 4. The height of the yoke member 3 on the studs 2 may be adjusted by means of nuts 5. The end of the bolt 4 is adapted to enter a depression (not shown) formed in the upper surface of a metal block 6 and between the block 6 and the base member 1 of the press are arranged, in the sequence indicated, a slab 7 of insulating material, a primary crystal 8 consisting of a slab of piezo-electric quartz cut with its opposite flat faces normal to the electrical axis, a second slab 9 of insulating material, a metal plate 10 adapted to serve as an electrostatic shield, a third slab 11 of insulating material, a secondary crystal 12 also consisting of a slab of piezo-electric quartz cut with its opposite flat faces normal to the electrical axis, and, finally a further slab 13 of insulating material. The shielding plate 10 is apertured to pass over the studs 2 and when the apparatus is in use the plate 10 is connected directly to earth as indicated.

The necessary electrodes for applying the potentials to be measured across the primary crystal 8 and for taking off the potentials set up across the secondary crystal 12 are not shown in Figure 1 but these may consist of strips of metal foil inserted between the crystal and adjacent slab of insulating material in each case. It will be seen that when the bolt 4 is screwed down to apply pressure to the crystals any variations in the strain set up in the primary crystal due to potentials applied thereto will result in varying stresses being transmitted to the secondary crystal and corresponding potential differences will be set up on the opposite faces thereof, i. e., the invention utilizes both the direct and inverse piezo-electric effects.

A suitable circuit arrangement for measuring the voltage applied to a radio transmitting aerial and incorporating apparatus as illustrated in Figure 1 is shown in Figure 2 in which 8 is the primary crystal and 12 is the secondary crystal. As will be seen one electrode of each crystal is earthed and the aerial A whose voltage is to be measured is connected through a 0.1 mm. Fd. condenser C to the upper electrode of the primary crystal. The unearthed electrode of the secondary crystal (which in practice is preferably the one remote from the primary crystal) is connected to one deflecting plate P of a cathode ray oscillograph O the opposite deflecting plate P' of which is earthed. The cathode ray oscillograph tube is of usual construction and comprises a cathode K, Wehnelt cylinder W and anode AN the necessary biasing batteries B1 and B2 being connected as shown.

The ratio R of the voltage applied to the primary crystal to that set up across the secondary crystal is given by the equation:

$$R=\frac{H^2 E 4\pi t}{\kappa}$$

where E is the elasticity of the quartz; H is the piezo-electric constant; $t$ is the thickness of the secondary crystal; and $\kappa$ is the dielectric constant. The voltage transformation ratio is independent of the physical dimensions of the primary crystal and if H, $\kappa$ and E be given their appropriate values for quartz, the transformation ratio becomes:

$$R=\frac{t}{94.8}$$

It is thus possible measure a fraction of the aerial voltage without risk of electrical breakdown and furthermore, by reason of the fact that the capacity of the quartz is of the order of a few mm. F's. only, the power consumption is negligible. This latter feature constitutes the most important advantage of the device.

Although the size of the crystals employed will depend upon design considerations, the following sizes have been satisfactorily employed in practice:—primary and secondary crystals each about 1 cm. in diameter and 3 to 4 mm. thick; with this size of crystal an earthed shield consisting of a plate of brass about 1½" wide and 3" long will give satisfactory shielding and substantially prevent electrostatic interference between the crystals. A suitable screw press for holding crystals and earthed shield of these sizes is about 5" high with a 3" base.

The breakdown voltage of quartz crystal plates of the dimensions stated is of the order of 30,000 volts and if the whole device is intended to be used for measuring voltages higher than about 3,000 volts, the press with its crystals is preferably immersed in suitable oil. An arrangement of press with crystals of the size stated, immersed in a good quality transformer oil, can be safely and satisfactorily employed for the measurement of voltages of the order of 20,000 volts.

In practice the electrodes associated with the secondary crystal are shunted by a grid leak (not shown in Figure 2) of the order of 10 megohms in order to avoid false readings due to variations in the static pressure of the press. Although a cathode ray tube has been shown in Figure 2 for measuring the secondary voltage it is to be understood that any powerless voltage indicating device may be employed.

Having now particularly described and ascertained the nature of my said invention and in what manner the same is to be performed, I declare that what I claim is:

1. A piezo-electric voltmeter comprising a metallic clamping stand having a base member, two parallel arranged rods secured to said base, a yoke member located on the upper portion of said rods, an adjustable clamping bolt passing through said yoke, a primary and secondary piezo-electric crystal interposed within said base and yoke, means for applying voltages from the source to be measured to the opposite faces of the primary crystal, and means for measuring voltages set up across the opposite faces of the secondary crystal.

2. A piezo-electric voltmeter comprising a metallic clamping stand having a base member, two parallel arranged rods secured to said base, a yoke member located on the upper portion of said rods, an adjustable clamping bolt passing through said yoke, a primary and secondary piezo-electric crystal interposed within said base and yoke, an electrostatic shield interposed between said primary and secondary crystal, means for applying voltages from the source to be measured to the opposite faces of the primary crystal, and means for measuring voltages set up across the opposite faces of the secondary crystal.

3. A voltmeter arrangement comprising primary and secondary piezo-electric crystals electrically shielded from one another by a metallic plate which is connected to ground, said crystals being insulated from one another and arranged within a press so that the pressure thereof is applied through one to the other, means being provided for applying voltages from the source to be measured to opposite faces of the primary crystal, and known means being provided for measuring or indicating voltages set up across the opposite faces of the secondary crystal.

4. A voltmeter arrangement having primary and secondary piezo-electric crystals comprising a screw press having clamped thereto in the following order, a slab of insulating material, a slab of piezo-electric quartz cut with its opposite faces normal to the electrical axis, a second slab of insulating material, an earthed metal shielding plate, a third slab of insulating material, a further slab of piezo-electric quartz cut with its opposite flat faces normal to the electrical axis, a fourth slab of insulating material, means for applying voltages from the source to be measured to the opposite face of the primary crystal, and known means being provided for measuring or indicating voltages set up across the opposite face of the secondary crystal.

LEONARD MORRIS MYERS.